US010785126B2

(12) United States Patent
Geihsler et al.

(10) Patent No.: US 10,785,126 B2
(45) Date of Patent: Sep. 22, 2020

(54) INTEGRATED ANALYSIS AND RECLAMATION OF REMOTE SERVICE RESOURCES

(71) Applicant: ServiceNow, Inc., Santa Clara, CA (US)

(72) Inventors: Brian Eric Geihsler, Shoreline, WA (US); Benjamin Keith Stephens, Shoreline, WA (US); Patrick Richard Lowndes, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 89 days.

(21) Appl. No.: 16/230,628

(22) Filed: Dec. 21, 2018

(65) Prior Publication Data
US 2020/0204459 A1 Jun. 25, 2020

(51) Int. Cl.
*G06F 15/173* (2006.01)
*H04L 12/24* (2006.01)
*H04L 29/08* (2006.01)

(52) U.S. Cl.
CPC .......... *H04L 41/28* (2013.01); *H04L 41/0293* (2013.01); *H04L 67/025* (2013.01); *H04L 67/125* (2013.01)

(58) Field of Classification Search
USPC ....... 709/203, 206, 217, 219, 223, 224, 225, 709/226, 228, 230, 232, 238; 713/254; 726/8; 370/352
See application file for complete search history.

(56) References Cited

U.S. PATENT DOCUMENTS

| 7,627,617 | B2 | 12/2009 | Kavuri et al. | |
|---|---|---|---|---|
| 10,136,315 | B2* | 11/2018 | Gong | H04B 7/14 |
| 2003/0039237 | A1* | 2/2003 | Forslow | H04W 28/18 370/352 |
| 2006/0123226 | A1* | 6/2006 | Kumar | H04L 63/20 713/154 |
| 2007/0101418 | A1* | 5/2007 | Wood | G06F 21/31 726/8 |
| 2017/0169249 | A1 | 6/2017 | de Oliveira et al. | |
| 2017/0353444 | A1* | 12/2017 | Karangutkar | H04W 12/0602 |

OTHER PUBLICATIONS

ServiceNow Documentation, Set Up OAuth, printed from https://docs.servicenow.com, Oct. 22, 2018.

* cited by examiner

*Primary Examiner* — Quang N Nguyen
(74) *Attorney, Agent, or Firm* — Fletcher Yoder PC

(57) ABSTRACT

One or more databases contain data defining: a common authentication configuration for a plurality of remote services, and individual authentication configurations for each of the remote services, where a particular remote service of the remote services is associated with a particular individual authentication configuration. One or more server devices are configured to: (i) access, by way of the common authentication configuration and the particular individual authentication configuration, a master userid of the particular remote service; (ii) receive, from the particular remote service, a list of userids that are registered to the managed network and configured to use the particular remote service; (iii) receive, from the particular remote service, access data representing use of the particular remote service by the userids; (iv) determine, from the access data, most-recent access times of the userids; and (v) store, in the one or more databases, representations of the most-recent access times.

20 Claims, 12 Drawing Sheets

EVENT LIST FOR "FILE SHARING SERVICE" INTEGRATION

FORMAT: <EVENT ID> <TIMESTAMP> <USERID> <ACTIVITY> <FILE OR DIRECTORY>

800

```
10017  2018-11-05.19:32.33  alice  edit    expenses.xls
10016  2018-11-05.19:32.02  alice  edit    report.txt
10015  2018-11-05.16:09.54  bob    delete  PDF/
10014  2018-11-05.15:39.26  chris  add     lunch_menu.doc
10013  2018-11-05.12:44.31  alice  edit    expenses.xls
10012  2018-11-05.12:40.58  alice  add     expenses.xls
                              . . .
```

FIG. 8

"FILE SHARING SERVICE" USERID LIST

CURRENT TIME: 2018-11-01 09:30:08

| Name | Userid | Most-Recent Activity Time | Storage Used | Removal Candidate? | Remove? |
|---|---|---|---|---|---|
| Alice Smith | asmith | 2018-10-31 03:58:23 | 323.3KB | No | Yes |
| Bob Jones | bjones | 2018-08-03 13:44:13 | 14.0MB | No | Yes |
| Chris Andrews | candrews | 2018-07-24 21:56:11 | 42.3MB | Yes | Yes |
| David George | dgeorge | 2018-07-07 10:12:51 | 0.0MB | Yes | Yes |
| Ethan Will | ewill | 2018-11-01 07:37:42 | 355.9MB | No | Yes |
| Frank Underhill | funderhill | 2018-10-28 14:40:06 | 18.5MB | No | Yes |
| Gary Herman | gherman | 2018-09-27 03:36:59 | 64.8MB | No | Yes |
| Harriet Cabbel | hcabbel | 2018-07-02 09:55:01 | 4.7MB | Yes | Yes |
| Isadora Johnson | ijohnson | 2018-10-08 23:00:45 | 18.5MB | No | Yes |
| Jelena Maynard | jmaynard | 2018-09-23 13:06:50 | 64.8MB | No | Yes |

Showing 1-10 of 25 entries, 10 rows   Page: 01

[Remove All Candidates]

FIG. 9

INTEGRATED ANALYSIS AND RECLAMATION OF REMOTE SERVICE RESOURCES

BACKGROUND

Enterprises may make use of various remote third-party services for purposes of file sharing, workflow management, resource planning, and so on. These remote third-party services may also be referred to as remote services or cloud-based services. Typically, the enterprise is provided with an administrative, or master, account for such a remote service, with which it can create further accounts for individual users.

Often, there is a per-user or per-user-block monthly, quarterly or yearly charge for use of each remote service. Furthermore, each such user account is a potential target for hacking or malware that could compromise information that the enterprise would rather keep proprietary. Consequently, the enterprise might find it desirable to limit the number of user accounts to those users who actually need and/or actively use the remote service. But doing so is challenging because remote services often do not explicitly support ways of accurately determining the utilization of user accounts, and such mechanisms can vary between remote services.

SUMMARY

The embodiments herein provide an integrated and extensible framework for obtaining per-account utilization of remote services, and identifying specific accounts that are candidates for removal or suspension due to lack of activity. Using this framework, support for accessing and evaluating remote services can be rapidly added to a remote network management platform. Thus, an enterprise can reduce wasted resources and more proactively manage its users' access to remote services.

Each remote service may be configured with a master account for the enterprise, though which individual user accounts are controlled. The enterprise may grant the remote network management platform limited or full authority to use these master accounts to access the remote services. By way of such master accounts, information regarding the activity of the user accounts may be obtained. From this information, the remote network management platform may automatically determine, for each configured remote service, one or more user accounts that are candidates for removal or suspension.

Herein, the term "userid" may refer to an account on a remote service. Thus, a "master userid" may refer to a master account, and an "individual userid" or "userid" may refer to a user account.

A first example embodiment may involve a computational instance of a remote network management platform, where the computational instance is associated with a managed network. The computational instance may include one or more databases containing data defining: a common authentication configuration for a plurality of remote services, and individual authentication configurations for each of the remote services, where the remote services are hosted outside of the remote network management platform and the managed network, and where a particular remote service of the remote services is associated with a particular individual authentication configuration of the individual authentication configurations. The computational instance may also include one or more server devices configured to: (i) access, by way of the common authentication configuration and the particular individual authentication configuration, a master userid at the particular remote service; (ii) receive, from the particular remote service, a list of userids that are registered to the managed network and that are configured to use the particular remote service; (iii) receive, from the particular remote service, access data representing use of the particular remote service by the userids; (iv) determine, from the access data, most-recent access times of the userids, where the most-recent access times respectively define when the userids were last used to access the particular remote service; and (v) store, in the one or more databases, representations of the most-recent access times of the userids.

A second example embodiment may involve accessing, by way of a common authentication configuration and a particular individual authentication configuration, a master userid of a particular remote service of a plurality of remote services, where the master userid is associated with a managed network, and where one or more databases of the computing system contain data defining: the common authentication configuration for the plurality of remote services, and individual authentication configurations for each of the remote services. The second example embodiment may also involve receiving, from the particular remote service, a list of userids that are registered to the managed network and that are configured to use the particular remote service. The second example embodiment may also involve receiving, from the particular remote service, access data representing use of the particular remote service by the userids. The second example embodiment may also involve determining, from the access data, most-recent access times of the userids, where the most-recent access times respectively define when the userids were last used to access the particular remote service. The second example embodiment may also involve storing, in the one or more databases, representations of the most-recent access times of the userids.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts an event log of a file sharing service, in accordance with example embodiments.

FIG. 9 depicts a web-based interface for displaying userid activity related to a file sharing service, in accordance with example embodiments.

DETAILED DESCRIPTION

Figure 1:
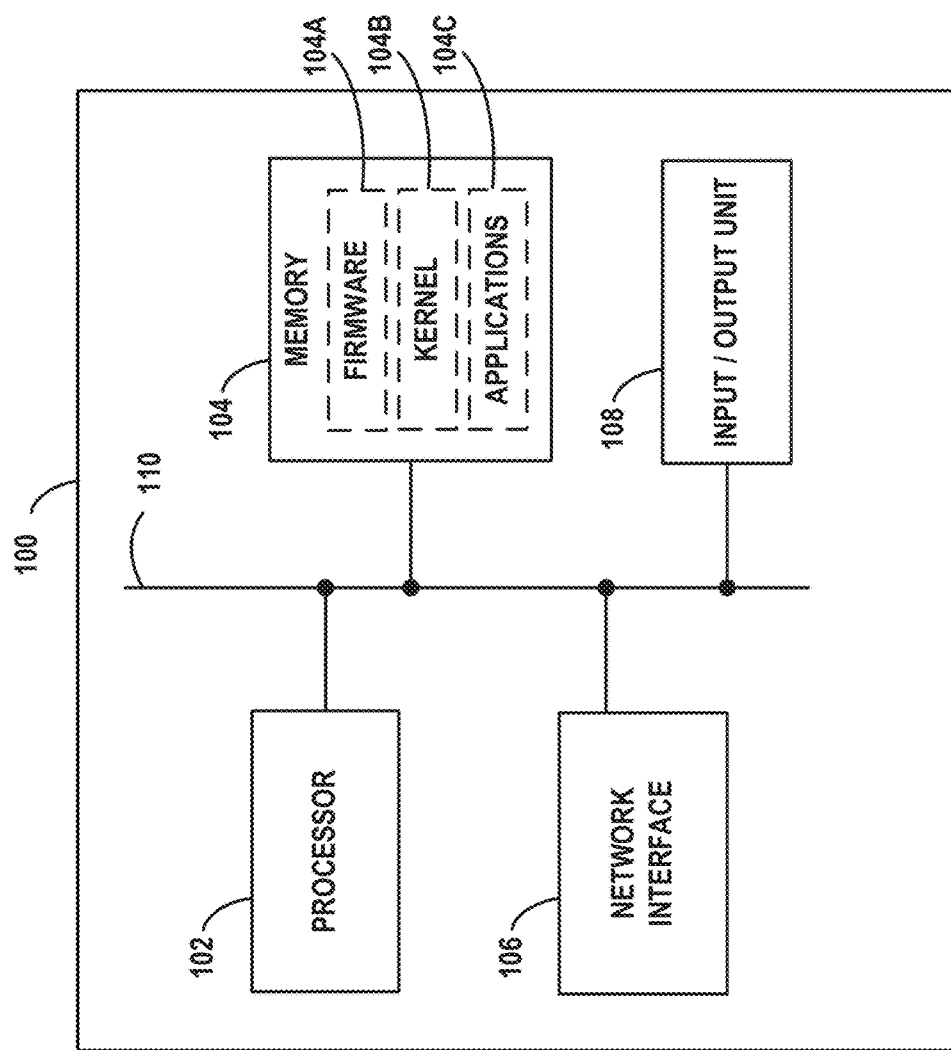
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
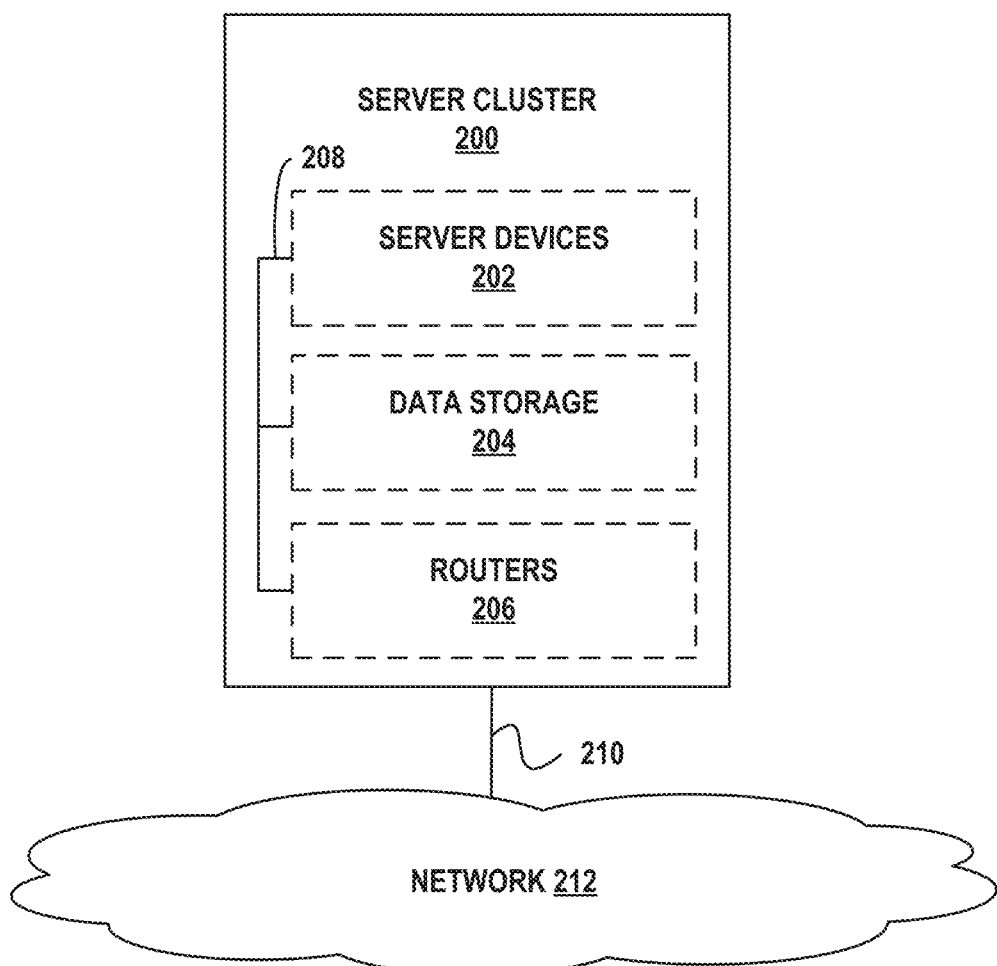
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
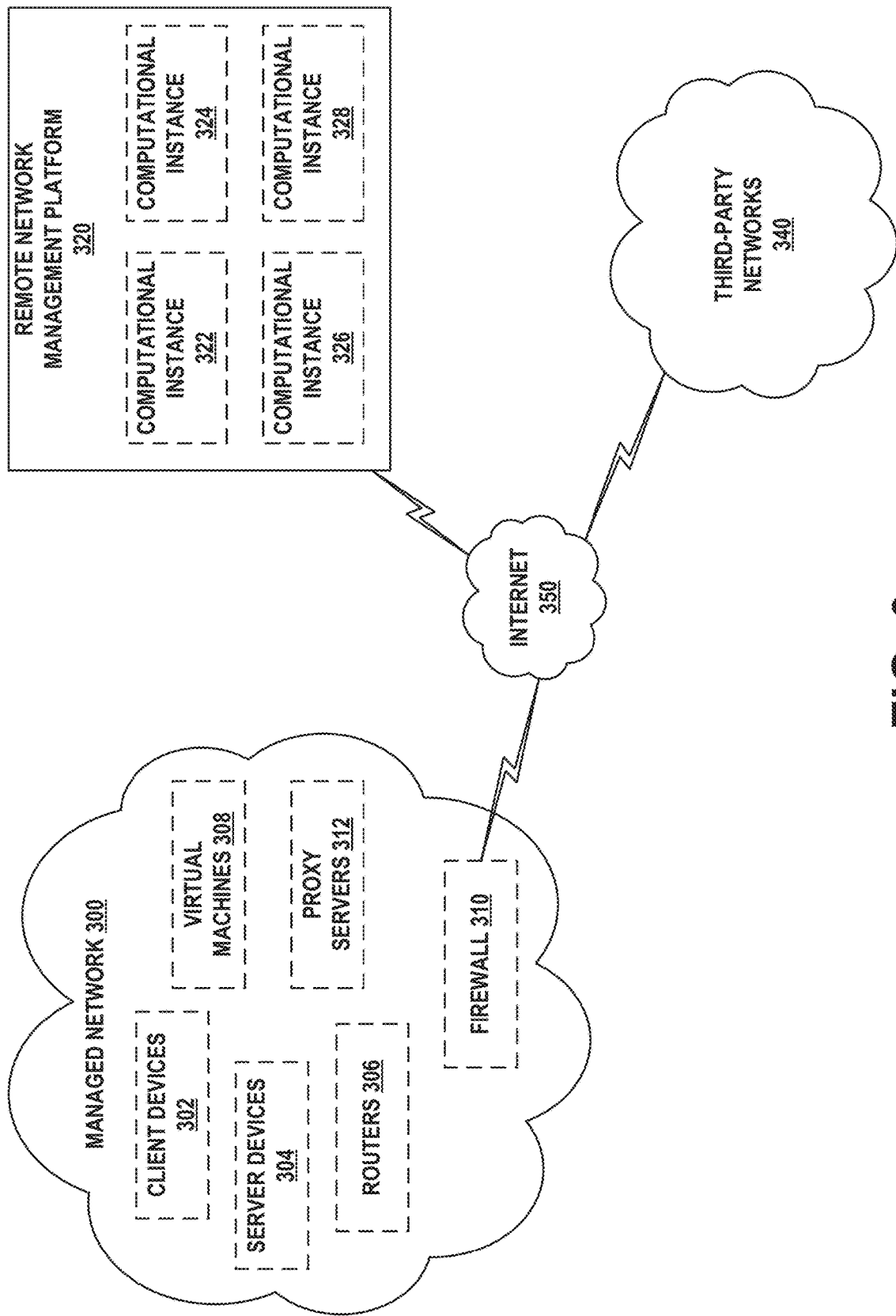
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
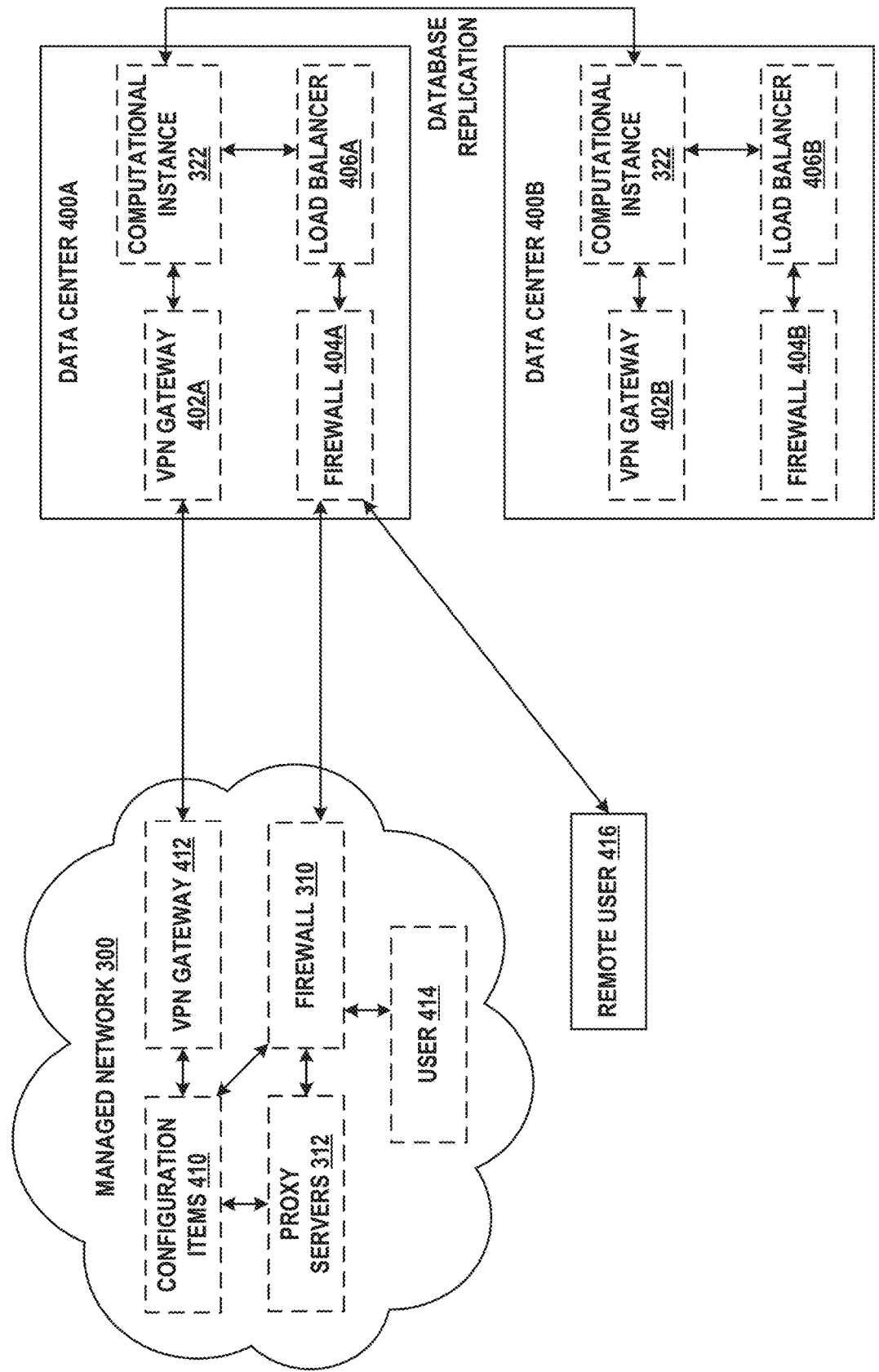
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
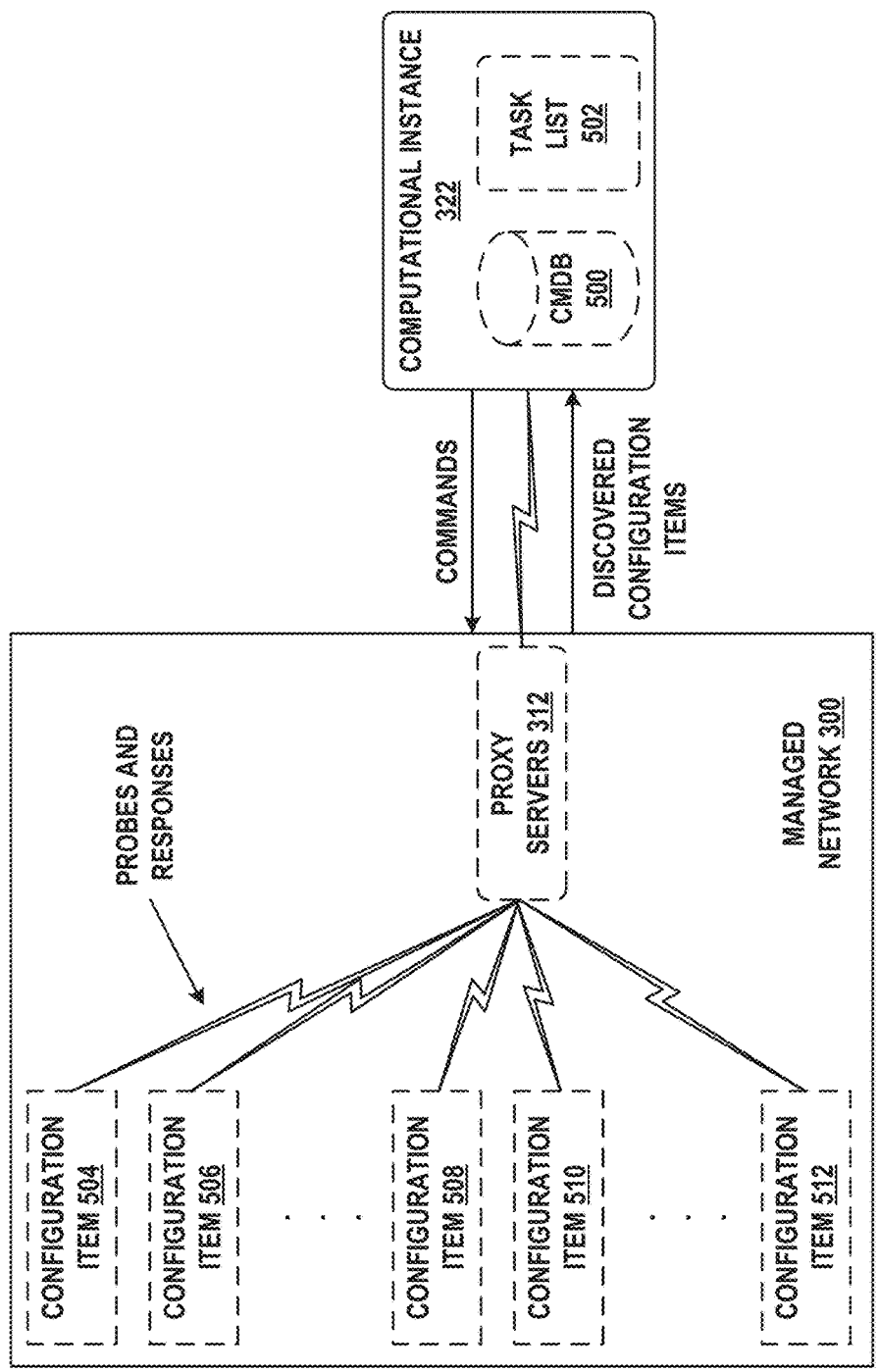
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
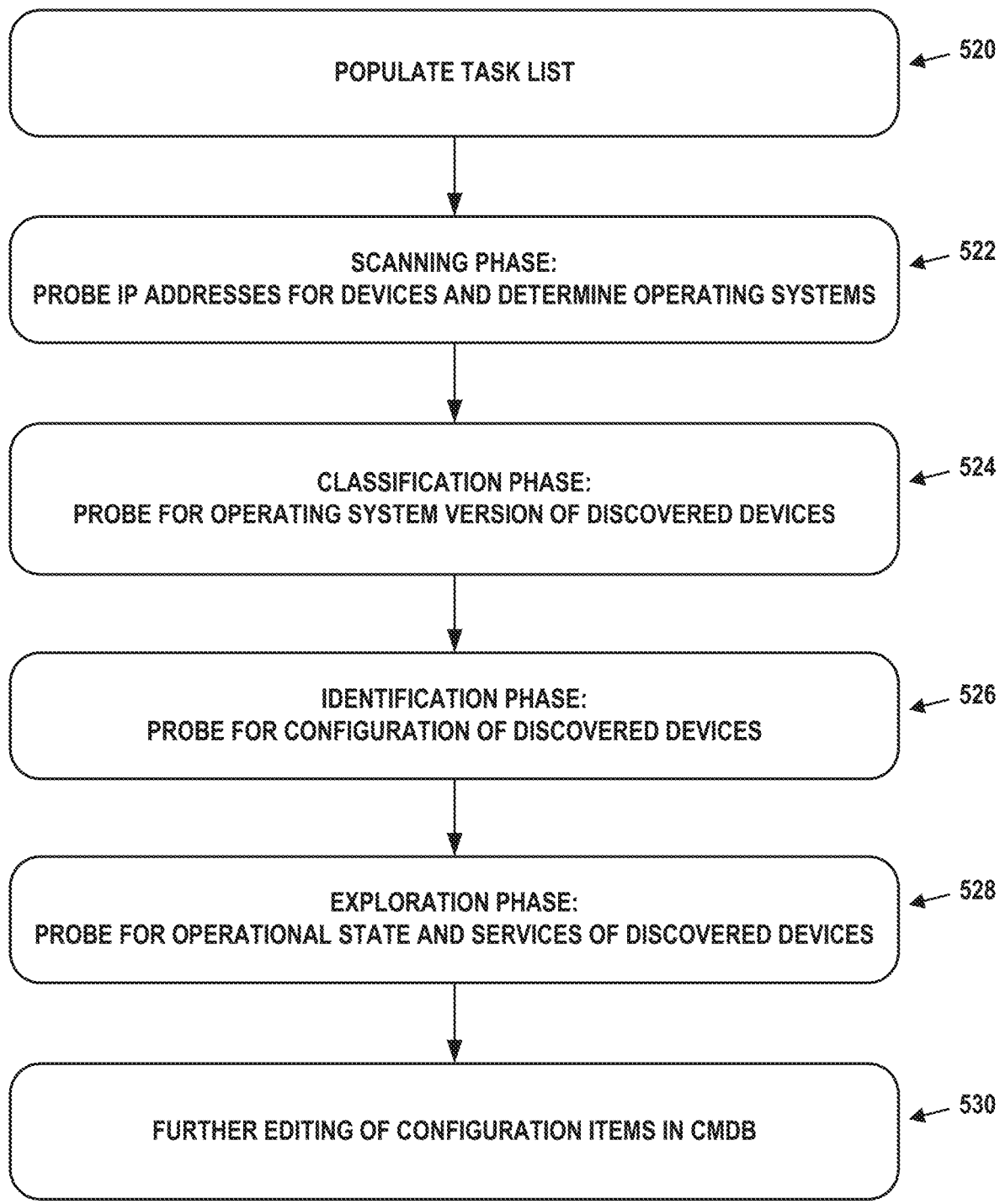
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Integration Management of Remote Services

The embodiments herein provide an integrated and extensible framework for obtaining per-userid utilization of remote services, and identifying specific userids that are candidates for removal or suspension due to lack of activity. Using this framework, support for accessing and evaluating remote services can be rapidly added to a remote network management platform. In this fashion, an enterprise can reduce wasted resources and more proactively manage its users' access to these remote services.

A. Enterprise Use of Remote Services

Figure 6:
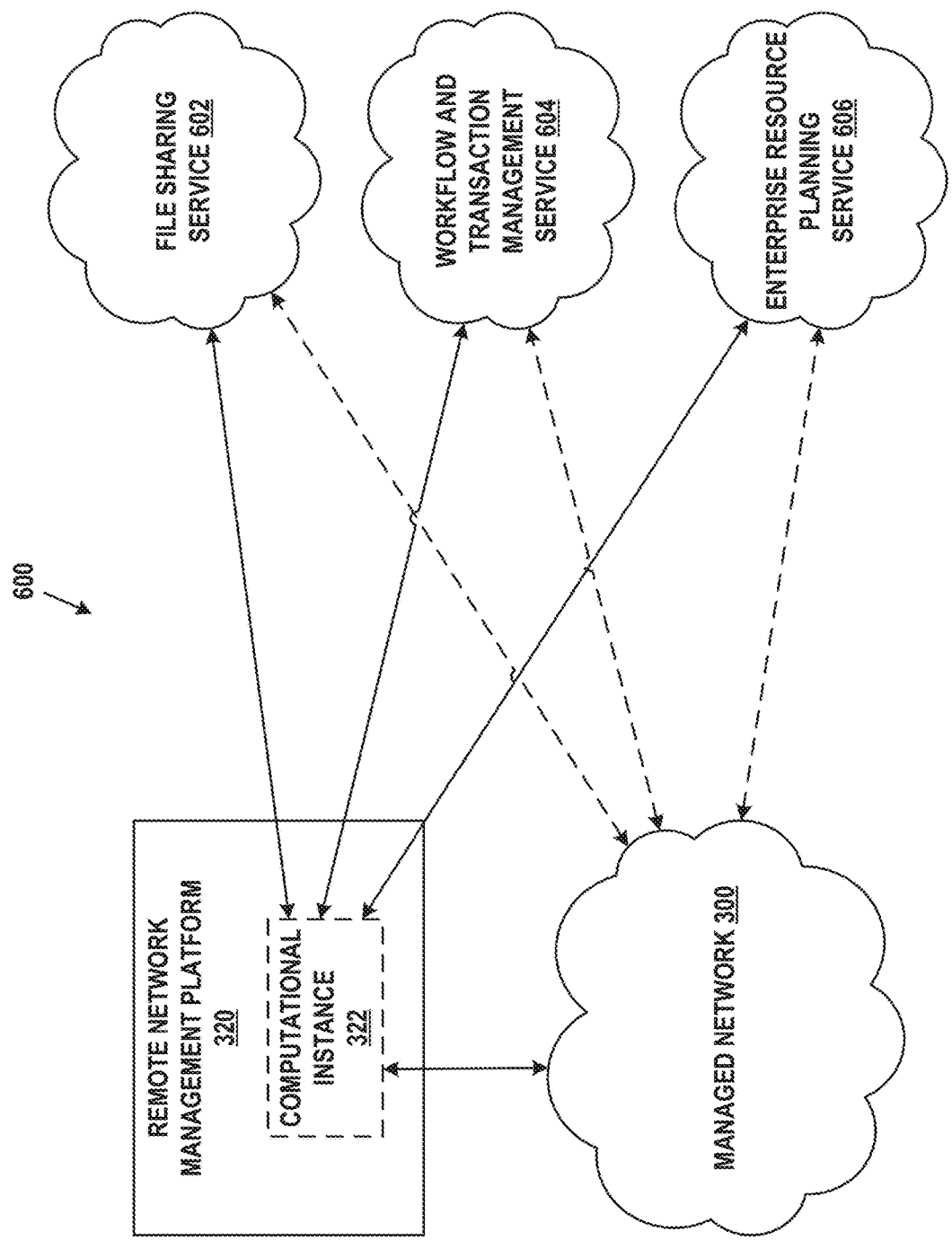
FIG. 6 depicts an architecture for supporting computational instance access to remote services, in accordance with example embodiments.

FIG. 6 depicts an example architecture 600 arranged to facilitate the embodiments herein. As shown in FIG. 6, remote network management platform 320 contains computational instance 322, and computational instance 322 manages or is otherwise associated with managed network 300.

It is assumed that managed network 300 is controlled by an enterprise or a similar entity that uses remote services. These include file sharing service 602, workflow and transaction management service 604, and enterprise resource planning (ERP) service 606. In some embodiments, managed network 300 may use fewer than three or more than three such remote services.

Each of the remote services may be hosted independently and separately from remote network management platform 320 and managed network 300. Thus, remote network management platform 320 and managed network 300 may access the remote services by way of the Internet or another type of wide-area network.

Managed network 300 may have enterprise-grade access to some or all of the remote services. This involves managed network 300 establishing a master userid (and associated credentials, such as a password) with a remote service. Through this master userid, managed network 300 may create, remove, suspend, manage permissions of, and review activity related to individual userids. In other words, individual users (e.g., employees of managed network 300) may each have a unique individual userid with which to access and use the remote service. These individual userids are managed and controlled by the master userid.

For example, managed network 300 may establish a master userid for file sharing service 602. With it, managed network 300 may create a number of individual userids on file sharing service 602 and distribute these userids to employees of managed network 300 that need or could benefit from use of this remote service. In FIG. 6, the dotted lines between managed network 300 and file sharing service 602, managed network 300 and workflow and transaction management service 604, and managed network 300 and ERP service 606 indicate that managed network 300 may directly communicate with such remote services.

A remote service may charge a managed network a certain amount per individual userid (e.g., $5, $10, $15, etc.) on a regular basis (e.g., monthly, quarterly, yearly, etc.). Furthermore, inactive userids may become a target for hackers or other actors to gain illicit access to the managed network's data. Thus, it is beneficial for managed network 300 to be able to determine whether and how much each individual userid is being used, and to delete, remove, suspend, and/or reclaim any such userids that have not been used for some pre-determined period of time (e.g., 3 months, 6 months, 12 months, etc.). Herein, the terms "remove" and "reclaim" may be used synonymously unless context suggests otherwise.

But making these activity determinations directly from managed network 300 is complicated and unwieldy, as it requires that someone with authority to use the master userids periodically access each remote service and perform an audit of userid utilization. In some cases, the remote service might not report all types of activity involving the individual userids in a way that can easily be reviewed, resulting in managed network 300 removing userids that are not inactive.

The embodiments herein centralize access to one or more remote services by way of a computational instance on a remote network management platform. For example, managed network 300 may configure computational instance 322 or remote network management platform 320 with master userids and/or associated credentials to access file sharing service 602, workflow and transaction management service 604, and ERP service 606. In this way, computational instance 322 can access these remote services on behalf of managed network 300 (as shown by the solid lines between computational instance 322 and file sharing service 602, computational instance 322 and workflow and transaction management service 604, and computational instance 322 and ERP service 606). Computational instance 322 may determine the most-recent activity time of each individual userid, and present this information in an easy to understand graphical user interface dashboard.

In particular, the most-recent activity time determination may be an intricate procedure that is different for various remote services, and may involve reviewing raw log files for these remote services. But with this information, computational instance 322 may obtain a more accurate view of individual userid activity, and may suggest one or more userids as candidates for removal or suspension from the remote service due to inactivity.

When an individual userid is suspended from the remote service, relevant files, configurations, and/or other information associated with the individual userid may be maintained, but access to the individual userid may be blocked. Furthermore, managed network 300 might not be charged for suspended individual userids. When an individual userid is removed from the remote service, computational instance 322 may copy relevant files, configurations, and/or other information from the individual userid to the master userid, and then delete the individual userid. In this way, any data related to the individual userid is preserved.

B. Computational Instance Access to Remote Services

In order to grant a computational instance access to master userids of remote services, as represented by the solid lines in FIG. 6, some form of authentication may take place between the computational instance and each of the remote services. Assuming that a master userid is associated with a password, the managed network may provision the computational instance with these credentials for the remote services.

Alternatively, a different authentication technique that does not expose the master userid and password to the computational instance may be employed. For example, an OAuth-based mechanism can be configured on both the computational instance and a remote service (this configuration requires agreement between the entities controlling the computational instance and the remote service to allow such authentication). This resulting mechanism allows the computational instance to access certain information on the remote service that is associated with the master userid. In particular, the computational instance and remote service may share an access token that is only known to these two entities and can be used only to allow the computational instance to access (without the master userid or password) a pre-defined set of information stored on or available to the remote service.

The access token may be generated when a user of the managed network requests that the computational instance access the remote service. The computational instance may open a window or other interface to the remote service, this interface prompting entry of the master userid and password. Once the remote service authenticates these credentials, it may explicitly ask the user if he or she wishes the computational instance to access the remote service. In some cases, the user may indicate that the computational instance can only access a subset of the data on the remote service.

Regardless of the exact permissions granted, the computational instance may request an access token from the remote service, and the remote service may generate and provide this token to the computational instance. At this point, the computational instance can use the token to request, from the remote service, data associated with the master userid. The computational instance may be able to, depending on the permissions granted to it, write or modify such data.

In some embodiments, other sequences of events or message flows may be able to establish an appropriate trust relationship between the computational instance and the remote service. Furthermore, the authentication mechanism of each remote service may be configured independently.

To enable such a configuration, the computational instance may prompt the user of the managed network to enter the appropriate configuration information for a remote service. This may be accomplished by way of a web page or series of web pages hosted by the computational instance.

Figure 7:
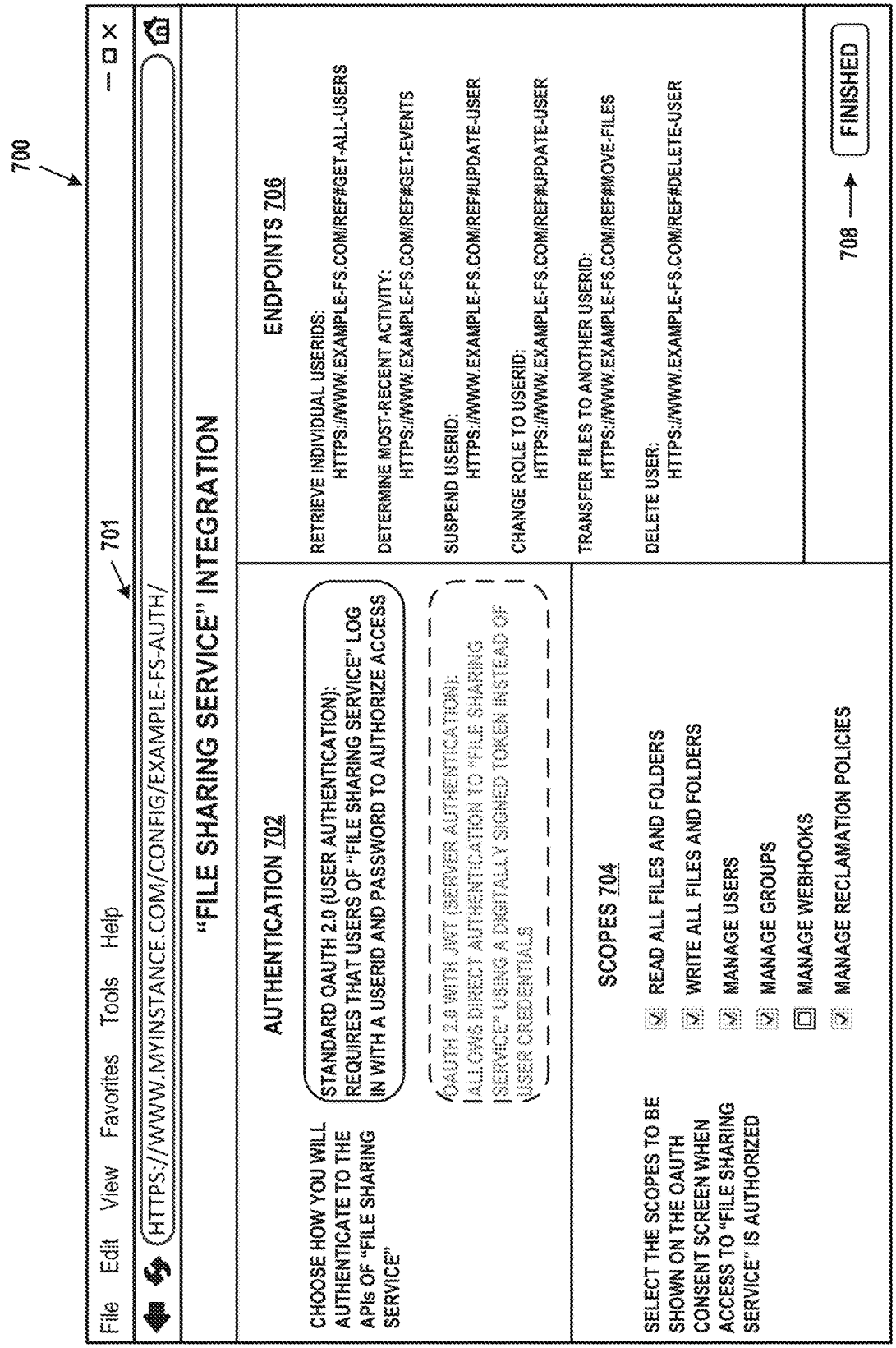
FIG. 7 depicts a web-based interface for configuring an integration between a computational instance and a file sharing service, in accordance with example embodiments.

FIG. 7 depicts such a web page 700. This web page facilitates OAuth configuration between the computational instance and a file sharing service. In particular, a user of the managed network, such as an administrator of userids for the file sharing service, may use URL 701 to access web page 700 on the computational instance.

Web page 700 may contain several panes. For example, authentication pane 702 may allow the user to select one of two or more authentication techniques. In FIG. 7, two such authentication techniques are shown, standard OAuth and OAuth using a JSON web token (JWT). The solid line around the description of standard OAuth indicates that standard OAuth is currently selected, and the dotted line around and grayed-out text of OAuth with JWT indicates that OAuth with JWT is not selected.

Scopes pane 704 defines various types of access permissions that are to be shown on the OAuth consent screen when the user grants the computational instance access to the master userid on the file sharing service. These scopes are shown as being individually selectable by way of checkboxes. The scopes include the ability to read from all files and folders, the ability to write to all files and folders, the ability to manage users (e.g., add userids, delete userids, change permissions for userids, etc.), the ability to manage groups of users (e.g., create groups for userids with some common characteristics, change the members of such groups, and/or delete such groups), the ability to manage webhooks (e.g., customized HTTP callbacks), and the ability to manage reclamation policies (e.g., when and how userids are to be suspended or removed).

Endpoints pane 706 define URLs through which the computational instance can cause the file sharing service to perform certain activities in accordance with scopes 704. These URLs may be representational state transfer (REST) endpoints, and when accessed may cause a script to execute that carries out a predefined tasks. As shown in endpoints 706, URLs may exist for retrieving a list of individual userids associated with the master userid, determining the most-recent activity of these individual userids, suspending a userid, changing the role to a userid (e.g., remotely accessing the file sharing service as a particular individual userid rather than the master userid), transferring files to another userid, and deleting a userid. Each of these URLs may be pre-determined for the file sharing service, and in some cases may be editable by way of web page 702.

Finished button 708 would typically be pressed, clicked on, or otherwise activated when the user is satisfied with the configuration as shown on web page 700. For instance, doing so could cause the computational instance to begin automatically managing userids on the file sharing service in accordance with the discussion below.

Notably, the graphical user interface of FIG. 7 is just one example of how such an interface can be arranged. Other arrangements are possible.

C. Remote Access Activities

Each remote service for which the computational instance is granted access may be associated with a scheduled job (implemented using, e.g., one or more scripts) that obtains a list of individual userids for the remote service and/or determines the most-recent activity times of each. The scheduled job may execute periodically or randomly. Periodic executions may take place, for example, once per day, once per week, or once per month. Randomly scheduled executions may be configured to execute according to a random variable with an expected value of, for example, once per day, once per week, or once per month (e.g., according to an exponentially-distributed random variable with an expected value of 1 day, 1 week, or 1 month, etc.). Randomly scheduled executions may alternatively be configured to take place at a random time within a pre-determined window of time (e.g., an execution may take place once per day at a random time uniformly-distributed over the hours of the day). Randomly scheduled jobs have the advantage of spreading out the load on the remote service (e.g., decreasing the likelihood that multiple jobs are scheduled to access the same remote service at the same time), especially if multiple computational instances of a remote network management platform are configured to access the remote service.

In any case, when the scheduled job for a particular computational instance executes, it may use the configuration for the remote service to access the remote service. For the example file sharing service described in the context of FIG. 7, the computational instance may use the authentication mechanism configured in authentication pane 702 to access the file sharing service. Then, the computational instance may obtain a list of the individual userids by way of the URL configured to "retrieve individual userids" in endpoints 706. Furthermore, the computational instance may, by way of the URL configured to "determine most-recent activity" in endpoints 706, obtain either an indication of the most-recent activity of one or more of the userids, or obtain an event list that can be used to determine the most-recent activity of one or more of the userids.

For example, some remote services may provide one or more REST APIs through which the most-recent activity time of one or more userids may be obtained. These most-recent activity times may represent the last time that the userid logged on or logged off the remote service. But for some types of remote services (e.g., file sharing services), certain activities involving a userid and the remote service may take place without the userid explicitly logging in to the remote service. In particular, when a userid uploads one or more files to a file sharing service, downloads one or more files from a file sharing service, or deletes a file stored on the file sharing service, this activity may not be recorded as the userid logging on to the file sharing service.

Consequently, just considering logging on or logging off a remote service might not provide an accurate view of a userid's use of that service. Notably, if other activities are ignored, some userids may be considered to have so little recent utilization that they are marked for removal, even if they are being heavily used for file transfers.

Accordingly, for some remote services, it may be beneficial to obtain a copy of at least part of an event log accessible by way of one or more REST APIs. For example, endpoints 706 includes a URL for obtaining most-recent activity, and this URL may represent a REST API that, when accessed, provides at least part of an event log. The event log may include entries for each activity taken by each individual userid managed by the master userid. Alternatively, REST endpoints may be parameterized by userids to return events only involving a specific userid. Furthermore, APIs using mechanisms other than REST may be used.

As an example, the URL https://www.example-fs.com/ref#get-events might return a list of all events for each individual userid managed by the master userid. On the other hand, the URL https://www.example-fs.com/ref#get-events/{uid}, where {uid} is a parameter, might return only events involving the userid specified by the parameter. Regardless, the requested events may be returned in a JSON payload, which can then be parsed by the computational instance.

An example is shown in FIG. 8. Event log snapshot 800 depicts an event log from a file sharing service. As indicated in FIG. 8, the format of event log snapshot 800 is a unique event identifier (<event id>), followed by a timestamp of when the event occurred (<timestamp>), followed by a userid that performed the event (<userid>), followed by a description of the activity involved in the event (<activity>), followed by a name of the file or directory that the event acted upon (<file or directory>). But this format is just for purpose of example, and other formats could be used.

In event log snapshot 800, event id 10017 took place on Nov. 5, 2018 at 7:32 PM, and involved userid alice editing a file named expenses.xls. Similarly, event id 10015 took place on Nov. 5, 2018 at 4:09 PM, and involved userid bob deleting a directory named PDF (the forward slash at the end of the <file or directory> field may indicate a directory while the lack thereof may indicate a file). Many other types events are possible, and the ellipsis at the bottom of event log snapshot 800 indicates that it may continue for at least some number of additional entries. In some situations, an event log may contain thousands of entries or more.

Regardless, from such an event log a computational instance can more accurately determine the most-recent activity time of each userid. For event log snapshot 800, the most-recent activity time of alice is Nov. 5, 2018 at 7:32 PM, the most-recent activity time of bob is Nov. 5, 2018 at 4:09 PM, and the most-recent activity time of chris is Nov. 5, 2018 at 3:39 PM. These determinations can be made by scanning the event log for the most-recent entry for each userid, and obtaining the corresponding timestamps.

D. Removal of Inactive Userids

As noted above, the computational instance may determine the most-recent activity times for one or more userids managed by the master userid and then provide this (and possibly other) information to the user. The computational instance may do so by way of a web interface or some other mechanism (e.g., email or a dedicated application).

FIG. 9 depicts web page 900 with activity and other information for a list of individual userids. Web page 900 displays the userids in a table 902, which includes columns for: a name 906 of a user associated with the userid, the userid 908, the determined most-recent activity time 910 of the userid, the storage used 912 by the userid, whether the userid is a removal candidate 914, and buttons 916 to manually remove userids. In some embodiments, table 902 may contain more or less information.

Text box 904 may act as a filter for information displayed in table 902. For example, when a term is entered in text box 904, table 902 may be adjusted to only display entries for userids that partially or fully match the term. Alternatively or additionally, entries for names that partially or fully match the term may be displayed.

The determined most-recent activity time 910 for each userid may be calculated based on when the userid has most-recently logged in or out of the file sharing service. Alternatively, the determined most-recent activity time 910 may be based on parsing an event log as described above.

The removal candidate 914 column indicates whether each userid is candidate for removal from the file sharing service. Such candidates are generally userids that have been inactive or otherwise have not used the remote service for a user-configurable period of time or a pre-determined period of time. This period of time may be 1 month, 3 months, 6 months, 12 months, or some other value. In the example of FIG. 9, the pre-determined period of time is 3 months. Thus, given that the current time is Nov. 1, 2018 at 9:30 AM (as shown in the upper right corner of web page 900), the userids candrews, dgeorge, and hcabbel are candidates for removal because their most-recent activity times are more than 3 months before the current time.

In addition to being able to manually remove userids regarding of activity by way of buttons 916, the user may be able to remove all candidates for removal by pressing, clicking on, or otherwise activating remove all candidates button 918. Doing so in the scenario depicted in FIG. 9 would result in userids candrews, dgeorge, and hcabbel being removed. In some embodiments, FIG. 9 may also display an amount of money saved by the managed network (e.g., per month, per-quarter, or per-year) if the candidate userids are removed.

As noted previously, the information displayed on web page 900 may be obtained by a scheduled job that executes periodically or randomly, for example. Thus, what is seen on web page 900 may represent the state of userids when the job was most-recently executed, not at the time that web page 900 was requested. In some embodiments, web page 900 may include a button or other control (not shown) that manually initiates the job to execute and provides its results.

Although it is not shown in FIG. 9, columns for indicating whether a userid is a candidate for suspension and/or manually suspending userids may be included in table 902. These columns may appear instead of or in addition to the columns for whether the userid is a removal candidate 914, and buttons 916 to manually remove userids.

When a userid is removed (reclaimed), some or all files, configuration information, and/or other data associated with the userid may be transferred to the master userid. This is so that valuable information associated with the removed userid is not lost. In some embodiments, a script specific to the relevant remote service may execute. This script may obtain files, configuration information, and/or other data associated with the userid, place this material in an archive (e.g., a compressed zip file), and move the archive to the master userid before deleting the userid. For example, when a userid on a file sharing service is removed, the directory structure of the userid's files and directories may be archived in a zip file, the zip file may be named appropriately (e.g., the userid and the current time may be included in the file name), and then moved to the master account for storage. But other possibilities exist.

E. Remote Services Integration Framework

The computational instance may implement the embodiments herein as a configurable framework that allows users of the managed network to easily add and customize integrations with new remote services. For example, each remote service may be defined with a particular scope (e.g., as defined by scopes 704 or a similar mechanism) and may be associated with one or more scripts that carry out integration functions.

In particular, each integration may include scripts for authentication, downloading userid information, calculating most-recent activity times of userids, removing userids, creating a scheduled job, and creating reports. An example of this framework is shown in FIG. 10.

Figure 10:
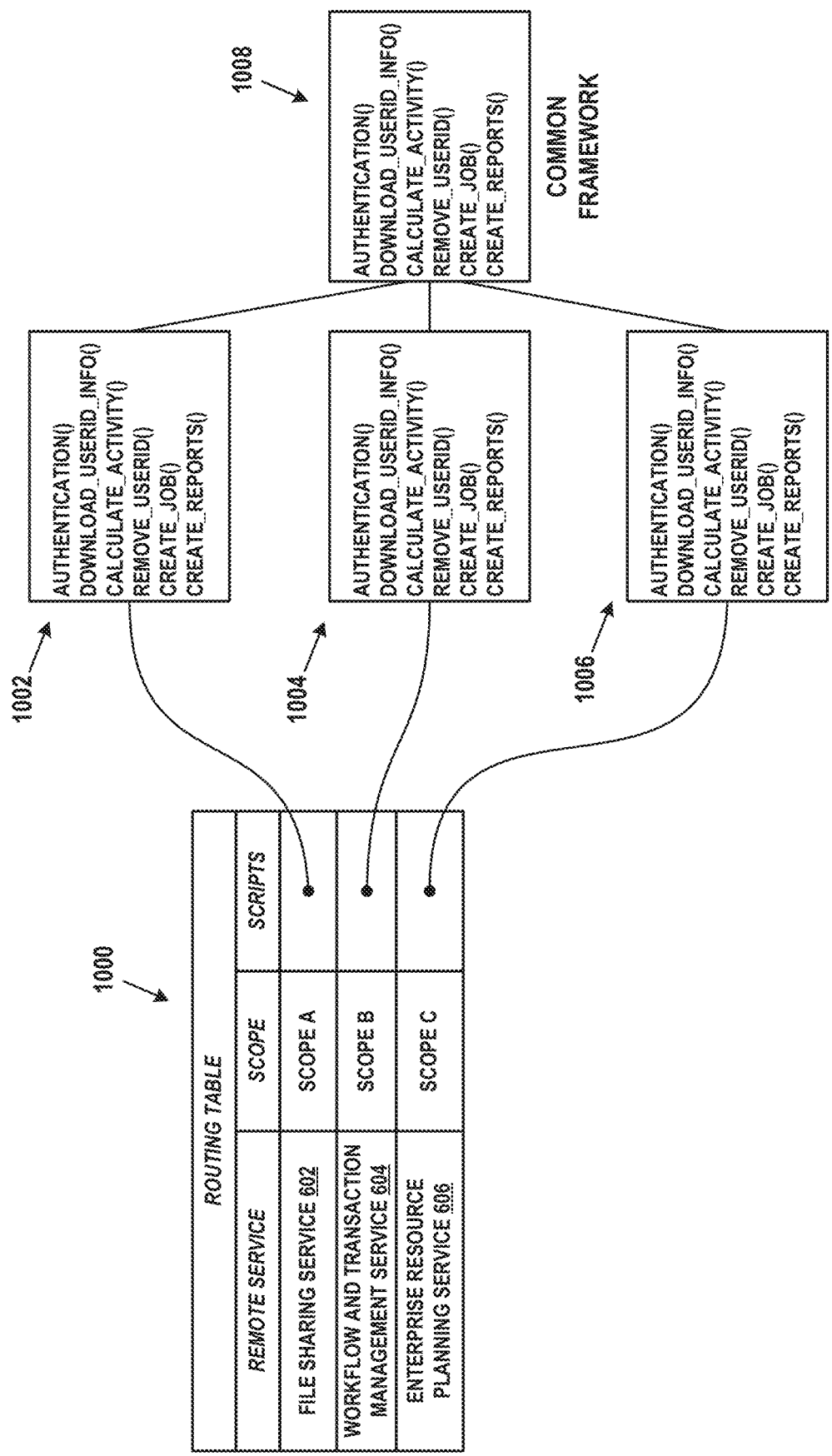
FIG. 10 depicts a framework for integration between a computational instance and remote services, in accordance with example embodiments.

In FIG. 10, routing table 1000 includes entries for three remote services: file sharing service 602, workflow and transaction management service 604, and ERP service 606. In some cases, routing table 1000 may include more or fewer entries.

Each entry is associated with a scope that defines what information that the computational instance has access to and possibly the nature of that access (e.g., read, write, create, delete, etc.). For example, file sharing service 602 has scope A, workflow and transaction management service 604 has scope B, and ERP service 606 has scope C. As noted above in the discussion of example scope 704, an administrator of the managed network may customize the scope for each remote service.

Each entry is also associated with one or more scripts. For example, file sharing service 602 is associated with scripts 1002, workflow and transaction management service 604 is associated with scripts 1004, and ERP service 606 is associated with scripts 1006. The scripts may include common function definitions across all remote services so that the interfaces to these functions are similar or the same. For example, the interface may be designed in an object-oriented fashion where the functions are defined in a base class or an abstract class, but implemented in a child class.

These functions may include: authentication( ) to establish an authentication mechanism between the computational instance and the remote service, download_userid_info( ) to retrieve information on userids from the remote service, calculate_activity( ) to determine which userids are inactive according to criteria specific to the remote service, remove_userid( ) to remove a userid( ) from the remote service, create_job( ) to define a scheduled job that will obtain user activity from the remote service from time to time, and create_reports( ) to execute a report related to the userids on the remote service.

Common framework 1008 may define general operations and data structures for some or each of these functions. For example, common framework 1008 may define the configuration and processing of an OAuth endpoint in its authentication( ) function. Then, the authentication( ) function of scripts 1002 may define which OAuth options and parameters are to be used when communicating with file sharing service 602. Likewise, the authentication( ) function of scripts 1004 may define which OAuth options and parameters are to be used when communicating with workflow and transaction management service 604.

This framework makes it simpler to integrate new remote services with the computational instance. For example, the calculate_activity( ) function can be used for the new remote service to determine which userids are inactive in a fashion that is specific to the new remote service (e.g., based on most-recent login times or based on an event log, for example). Since, in possible scenarios, some or all integrations will involve calling a function named calculate_activity( ) even if those functions perform different operations the program code to provide the integrations is simplified.

VI. Example Operations

Figure 11:
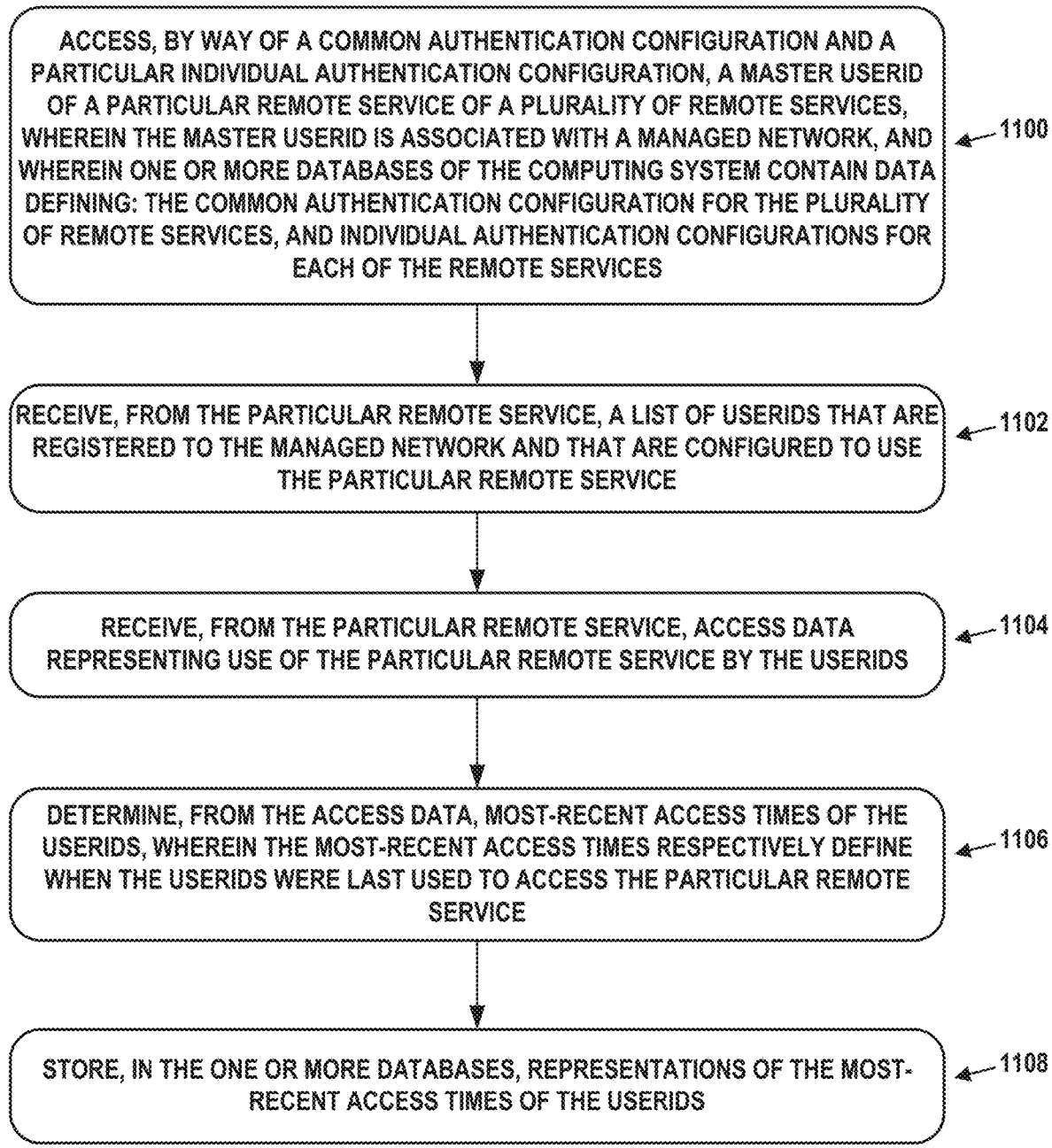
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve accessing, by way of a common authentication configuration and a particular individual authentication configuration, a master userid of a particular remote service of a plurality of remote services, where the master userid is associated with a managed network, and where one or more databases of the computing system contain data defining: the common authentication configuration for the plurality of remote services, and individual authentication configurations for each of the remote services.

Block 1102 may involve receiving, from the particular remote service, a list of userids that are registered to the managed network and that are configured to use the particular remote service.

Block 1104 may involve receiving, from the particular remote service, access data representing use of the particular remote service by the userids.

Block 1106 may involve determining, from the access data, most-recent access times of the userids, where the most-recent access times respectively define when the userids were last used to access the particular remote service.

Block 1108 may involve storing, in the one or more databases, representations of the most-recent access times of the userids.

In some embodiments, determining, from the access data, the most-recent access times of the userids involves determining when each of the userids last logged on the particular remote service or last logged off of the particular remote service.

In some embodiments, the access data includes log data representing transactions involving the particular remote service for each of the userids. Determining the most-recent access times of the userids may involve determining most-recent of the transactions for each of the userids.

In some embodiments, the transactions include one or more of: logging on or logging off of the particular remote service, a file transfer to or from the particular remote service, or editing or deletion of a file stored on the particular remote service.

In some embodiments, the common authentication configuration defines a generic type of authentication mechanism, where the individual authentication configurations define service-specific authentication configurations for each of the remote services, and where the service-specific authentication configurations for each of the remote services include authentication credentials for each of the remote services.

In some embodiments, the individual authentication configurations also define a set of permissions granted to the master userid when the master userid accesses the particular remote service by way of the computational instance.

In some embodiments, the one or more server devices are further configured to: (i) possibly based on the most-recent access times of the userids, identify one or more of the userids that have not been used for at least a pre-defined threshold periodic of time, and (ii) indicate that the one or more identified userids are candidates for removal from the particular remote service. Additionally, the one or more server devices may be further configured to: (i) receive a confirmation, by way of the master userid, to remove the one or more identified userids from the particular remote service, and (ii) possibly in response to receiving the confirmation, (a) move files or configuration information stored on the particular remote service in association with the one or more identified userids to be associated with the master userid, and (b) remove the one or more identified userids from the particular remote service.

In some embodiments, the particular remote service is associated with a randomly scheduled job that accesses the master userid, receives the list of userids, and receives the access data.

In some embodiments, the data contained in the one or more databases also includes one or more scripts associated with the particular remote service, where determining the most-recent access times of the userids involves executing at least one of the one or more scripts.

In some embodiments, a further particular remote service of the remote services is associated with a further particular individual authentication configuration of the individual authentication configurations, and the one or more server devices are further configured to: (i) access, by way of the common authentication configuration and the further particular individual authentication configuration, a further master userid at the further particular remote service, (ii) receive, from the further particular remote service, a list of further userids that are registered to the managed network and that are configured to use the further particular remote service, (iii) receive, from the further particular remote service, further access data representing use of the further particular remote service by the further userids, (iv) determine, from the further access data, further most-recent access times of the further userids, where the further most-recent access times respectively define when the further userids were last used to access the further particular remote service, and (v) store, in the one or more databases, further representations of the further most-recent access times of the further userids.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computational instance of a remote network management platform, wherein the computational instance is associated with a managed network, the computational instance comprising:

one or more databases containing data defining: a common authentication configuration for a plurality of remote services, and individual authentication configurations for each of the remote services, wherein the remote services are hosted outside of the remote network management platform and the managed network, and wherein a particular remote service of the remote services is associated with a particular individual authentication configuration of the individual authentication configurations; and one or more server devices configured to:

access, by way of the common authentication configuration and the particular individual authentication configuration, a master userid at the particular remote service;

receive, from the particular remote service, a list of userids that are registered to the managed network and that are configured to use the particular remote service;

receive, from the particular remote service, access data representing use of the particular remote service by the userids;

determine, from the access data, most-recent access times of the userids, wherein the most-recent access times respectively define when the userids were last used to access the particular remote service; and store, in the one or more databases, representations of the most-recent access times of the userids.

2. The computational instance of claim 1, wherein determining, from the access data, the most-recent access times of the userids comprises determining when each of the userids last logged on the particular remote service or last logged off of the particular remote service.

3. The computational instance of claim 1, wherein the access data includes log data representing transactions involving the particular remote service for each of the userids, and wherein determining the most-recent access times of the userids comprises determining most-recent of the transactions for each of the userids.

4. The computational instance of claim 3, wherein the transactions include one or more of: logging on or logging off of the particular remote service, a file transfer to or from the particular remote service, or editing or deletion of a file stored on the particular remote service.

5. The computational instance of claim 1, wherein the common authentication configuration defines a generic type of authentication mechanism, wherein the individual authentication configurations define service-specific authentication configurations for each of the remote services, and wherein the service-specific authentication configurations for each of the remote services include authentication credentials for each of the remote services.

6. The computational instance of claim 1, wherein the individual authentication configurations also define a set of permissions granted to the master userid when the master userid accesses the particular remote service by way of the computational instance.

7. The computational instance of claim 1, wherein the one or more server devices are further configured to:

based on the most-recent access times of the userids, identify one or more of the userids that have not been used for at least a pre-defined threshold periodic of time; and indicate that the one or more identified userids are candidates for removal from the particular remote service.

8. The computational instance of claim 7, wherein the one or more server devices are further configured to:

receive a confirmation, by way of the master userid, to remove the one or more identified userids from the particular remote service; and in response to receiving the confirmation, (i) move files or configuration information stored on the particular remote service in association with the one or more identified userids to be associated with the master userid, and (ii) remove the one or more identified userids from the particular remote service.

9. The computational instance of claim 1, wherein the particular remote service is associated with a randomly scheduled job that accesses the master userid, receives the list of userids, and receives the access data.

10. The computational instance of claim 1, wherein the data contained in the one or more databases also includes one or more scripts associated with the particular remote service, and wherein determining the most-recent access times of the userids involves executing at least one of the one or more scripts.

11. The computational instance of claim 1, wherein a further particular remote service of the remote services is associated with a further particular individual authentication configuration of the individual authentication configurations, and wherein the one or more server devices are further configured to:

access, by way of the common authentication configuration and the further particular individual authentication configuration, a further master userid at the further particular remote service;

receive, from the further particular remote service, a list of further userids that are registered to the managed network and that are configured to use the further particular remote service;

receive, from the further particular remote service, further access data representing use of the further particular remote service by the further userids;

determine, from the further access data, further most-recent access times of the further userids, wherein the further most-recent access times respectively define when the further userids were last used to access the further particular remote service; and store, in the one or more databases, further representations of the further most-recent access times of the further userids.

12. A computer-implemented method comprising:

accessing, by a computing system and by way of a common authentication configuration and a particular individual authentication configuration, a master userid of a particular remote service of a plurality of remote services, wherein the master userid is associated with a managed network, and wherein one or more databases of the computing system contain data defining: the common authentication configuration for the plurality of remote services, and individual authentication configurations for each of the remote services;

receiving, by the computing system and from the particular remote service, a list of userids that are registered to the managed network and that are configured to use the particular remote service;

receiving, by the computing system and from the particular remote service, access data representing use of the particular remote service by the userids;

determining, by the computing system and from the access data, most-recent access times of the userids, wherein the most-recent access times respectively define when the userids were last used to access the particular remote service; and storing, by the computing system and in the one or more databases, representations of the most-recent access times of the userids.

13. The computer-implemented method of claim 12, wherein determining, from the access data, the most-recent access times of the userids comprises determining when each of the userids last logged on the particular remote service or last logged off of the particular remote service.

14. The computer-implemented method of claim 12, wherein the access data includes log data representing transactions involving the particular remote service for each of the userids, and wherein determining the most-recent access times of the userids comprises determining most-recent of the transactions for each of the userids.

15. The computer-implemented method of claim 14, wherein the transactions include one or more of: logging on or logging off of the particular remote service, a file transfer to or from the particular remote service, or editing or deletion of a file stored on the particular remote service.

16. The computer-implemented method of claim 12, further comprising:
    based on the most-recent access times of the userids, identifying one or more of the userids that have not been used for at least a pre-defined threshold periodic of time; and
    indicating that the one or more identified userids are candidates for removal from the particular remote service.

17. The computer-implemented method of claim 16, further comprising:
    receiving a confirmation, by way of the master userid, to remove the one or more identified userids from the particular remote service; and
    in response to receiving the confirmation, (i) moving files or configuration information stored on the particular remote service in association with the one or more identified userids to be associated with the master userid, and (ii) removing the one or more identified userids from the particular remote service.

18. An article of manufacture including a non-transitory computer-readable medium, having stored thereon program instructions that, upon execution by a computing system, cause the computing system to perform operations comprising:
    accessing, by way of a common authentication configuration and a particular individual authentication configuration, a master userid of a particular remote service of a plurality of remote services, wherein the master userid is associated with a managed network, and wherein one or more databases of the computing system contain data defining: the common authentication configuration for the plurality of remote services, and individual authentication configurations for each of the remote services;
    receiving, from the particular remote service, a list of userids that are registered to the managed network and that are configured to use the particular remote service;
    receiving, from the particular remote service, access data representing use of the particular remote service by the userids;
    determining, from the access data, most-recent access times of the userids, wherein the most-recent access times respectively define when the userids were last used to access the particular remote service; and
    storing, in the one or more databases, representations of the most-recent access times of the userids.

19. The article of manufacture of claim 18, the operations further comprising:
    based on the most-recent access times of the userids, identifying one or more of the userids that have not been used for at least a pre-defined threshold periodic of time; and
    indicating that the one or more identified userids are candidates for removal from the particular remote service.

20. The article of manufacture of claim 19, the operations further comprising:
    receiving a confirmation, by way of the master userid, to remove the one or more identified userids from the particular remote service; and
    in response to receiving the confirmation, (i) moving files or configuration information stored on the particular remote service in association with the one or more identified userids to be associated with the master userid, and (ii) removing the one or more identified userids from the particular remote service.

\* \* \* \* \*